(12) United States Patent
Wessling (10) Patent No.: US 12,210,475 B2
(45) Date of Patent: Jan. 28, 2025

(54) ASSEMBLY UNIT HAVING A CIRCUIT UNIT ELECTRICALLY CONNECTED TO A HIGHER-LEVEL SWITCHING SYSTEM, AND METHOD FOR DISCONNECTING THE CIRCUIT UNIT FROM THE SWITCHING SYSTEM

(71) Applicant: Phoenix Contact GmbH & Co.KG, Blomberg (DE)

(72) Inventor: Klaus Wessling, Bueckeburg (DE)

(73) Assignee: Phoenix Contact GmbH & Co.KG, Blomberg (DE)

( * ) Notice: Subject to any disclaimer, the term of this patent is extended or adjusted under 35 U.S.C. 154(b) by 0 days.

(21) Appl. No.: 18/026,426

(22) PCT Filed: Sep. 16, 2021

(86) PCT No.: PCT/EP2021/075499
§ 371 (c)(1),
(2) Date: Mar. 15, 2023

(87) PCT Pub. No.: WO2022/058433
PCT Pub. Date: Mar. 24, 2022

(65) Prior Publication Data
US 2023/0342322 A1    Oct. 26, 2023

(30) Foreign Application Priority Data
Sep. 17, 2020 (BE) .................................. 2020/5642

(51) Int. Cl.
*G06F 13/40* (2006.01)
*G06F 13/38* (2006.01)

(52) U.S. Cl.
CPC ........ *G06F 13/4081* (2013.01); *G06F 13/385* (2013.01)

(58) Field of Classification Search
None
See application file for complete search history.

(56) References Cited

U.S. PATENT DOCUMENTS 5,530,302 A    6/1996 Hamre et al.
5,625,238 A    4/1997 Ady et al.
(Continued)

FOREIGN PATENT DOCUMENTS

DE    10261294 A1    8/2004
EP    0254456 A2    1/1988
(Continued)

OTHER PUBLICATIONS

International Search Report and Written Opinion mailed Dec. 6, 2021, issued in connection with corresponding International application No. PCT/EP2021/075499 with English translation (17 pages total).

(Continued)

*Primary Examiner* — Farley Abad
*Assistant Examiner* — Dayton Lewis-Taylor
(74) *Attorney, Agent, or Firm* — John Maldjian, Esq.; Stevens & Lee PC (57) ABSTRACT

Embodiments of the present invention relates to an assembly unit having an electronic circuit unit which is accommodated in a housing, can be electrically connected to a higher-level switching system for signal and power supply purposes and comprises a signal processing unit for controlling consumer elements which are connected to the assembly unit, are installed within the housing or being virtual consumer elements-, wherein the signal processing unit comprises a plurality of units which are interact so as to allow, during operation, electrical disconnection of the assembly unit with load current-free electronic circuit unit from the state electrically connected to a higher-level (Continued)

switching system. Embodiments of the present invention also relates to a switching system comprising an assembly unit of this kind, and to a corresponding method.

10 Claims, 5 Drawing Sheets

(56) References Cited

U.S. PATENT DOCUMENTS

| | | | |
|---|---|---|---|
| 5,959,992 A * | 9/1999 | Benayoun | H04L 12/5601 |
| | | | 370/395.6 |
| 6,125,417 A | 9/2000 | Bailis et al. | |
| 6,138,194 A | 10/2000 | Klein et al. | |
| 2003/0026525 A1 * | 2/2003 | Alvarez | H04Q 11/0005 |
| | | | 385/16 |

FOREIGN PATENT DOCUMENTS

| | | |
|---|---|---|
| EP | 2648109 A1 | 10/2013 |
| GB | 2385205 A | 8/2003 |

OTHER PUBLICATIONS

English translation of the International Preliminary Report on Patentability issued Mar. 21, 2023, in connection with corresponding international application No. PCT/EP2021/075499 (7 pages total).

* cited by examiner

ASSEMBLY UNIT HAVING A CIRCUIT UNIT ELECTRICALLY CONNECTED TO A HIGHER-LEVEL SWITCHING SYSTEM, AND METHOD FOR DISCONNECTING THE CIRCUIT UNIT FROM THE SWITCHING SYSTEM

CROSS REFERENCE

This application claims the benefit under 35 U.S.C. § 371 of International Application No. PCT/EP2021/075499, filed on Sep. 16, 2021, which in turn claims the benefit of Belgian Application No. BE2020/5642, filed on Sep. 17, 2020, the entire contents of which are hereby incorporated by reference in their entirety.

FIELD

Embodiments of the present invention relate to an assembly unit having a circuit unit which is accommodated therein and can be electrically connected to a higher-level switching system, and to a method of disconnecting a circuit unit of this kind from a switching system of this kind.

BACKGROUND

Systems with so-called "hot-plug" functionality are known from the prior art, which enable the exchange or addition of electronic circuit units during operation. Such a "hot-plug" functionality is used, for example, in modular constructed systems to enable rapid removal of such a circuit unit from a higher-level switching system or replacement of such a circuit unit electrically connected to the switching system without having to switch off the switching system and, in particular, any installation connected to it, in order to achieve higher availability.

Usually, several such individually removable and replaceable circuit units are electrically connected to such a switching system. For the removability and exchangeability of a respective circuit unit, such a unit is normally accommodated in an assembly unit, which can then be mechanically coupled to or also decoupled from the switching system, in particular in a modular manner. For this purpose, the switching system usually has several coupling points, in particular insertion or plug-in locations, via which the assembly units can be coupled to the switching system, and ultimately the respective circuit unit housed in one of the assembly units can be electrically connected to the switching system and also electrically disconnected again. If the circuit unit is electrically connected to the switching system, an assembly unit coupled accordingly to the switching system can often also be secured accordingly mechanically to prevent unintentional disconnection of the electrical contacts.

The challenge here is usually to take the load current into account when "electrically disconnecting" such circuit units. For example, the pulling process often causes voltage peaks and sparkovers between the contacts of the circuit unit and the switching system that establish the electrical connection. Depending on the level of the output current to be interrupted and/or the output load to be interrupted (e.g. inductive), the contacts making the electrical connection must be correspondingly "strong". In addition, these contacts age very strongly at these moments, since they should actually only be designed for a predetermined nominal current.

To counteract this, appropriately designed and thus also expensive robust contacts or special mechanical breakers are still generally used today for a possible exchange or removal of an assembly unit with a circuit unit housed in it under load.

In addition, the "electrical disconnection" of a circuit unit or, more generally, the pulling of an assembly unit with the circuit unit housed in it, i.e., the absence of this unit in the overall system, often constitutes a system failure.

An alternative possibility is, for example, to switch off the peripheral voltage of an entire installation or at least of parts of the installation for the period of the exchange or removal. This requires an additional action, i.e., in particular switching off the peripheral voltage, and results in the shutdown of the installation or at least parts of the installation.

The publication DE 102 61 294 B4 discloses an actuating element for a "hot-plug" functionality of an assembly unit designed as a flat assembly, which is accommodated in a flat assembly rack of a computer system. The actuating element is arranged there as a separate element on the flat assembly rack and has an assembly with a manually actuated switch for interrupting the power supply to the flat assembly unit, with signaling means for signaling the power supply and operating state of the flat assembly unit, and with a sensor for indicating the position of a locking slide guided so as to be manually displaceable between at least two switching positions in a frame holding the assembly.

Referring to EP 0 254 456 B1, for providing a "hot-plug" functionality for a flat assembly unit connectable via a connector to a power supply circuit, a ground line, and a control circuit, a switching device disposed on the flat assembly unit and including a manually actuated unlocking switch. During unlocking/locking, the unlocking switch pivots a switch cooperating therewith between a first and a second state, whereby the switch in the second state provides a closed ground line path to the control circuit, and thereupon by means of a clock circuit any signal transmission via the connector is prevented and subsequently the power supply circuit is blocked for the supply of power to the flat assembly unit. For this purpose, however, a complex process must first be triggered overall by means of the mechanically pivoted switch, and the disconnection of the signal and power supply to the flat assembly unit already takes place when the flat assembly unit is not yet removed.

As indicated in U.S. Pat. No. 5,530,302, a "hot-pluggable" flat assembly unit in the form of a printed circuit board module with a module voltage bus that can be coupled to a backplane with a main power bus is known. The printed circuit board module has an eject lever and an eject lever cover pivotally disposed on the outside of the printed circuit board module, the eject lever cover being pivotally operable to selectively cover the eject lever for locking the printed circuit board module to the backplane and to expose the eject lever for unlocking and subsequently pulling the printed circuit board module. Further, a switch cooperating with the eject lever cover is provided to cause a first or a second output signal in a control device disposed on the printed circuit board module in response to the taken pivot position of the eject lever cover. As a result, the power supplied to the module voltage bus via the main power bus to supply the printed circuit board module is slowly ramped up or slowly ramped down within a predetermined period of time in the printed circuit board module itself. The power conducted on the main power bus remains uninterrupted and unaffected during the regulation of the power between the main power bus and the module voltage bus.

It is known from EP2 648 109 B1 to provide a mechanical or optical detection device on a receptacle of a computer device for a removable medium, with which the removal of the removable medium from the receptacle is detected and, based on this, the power supply is disconnected from the removable medium connection when the removable medium is removed and then completely switched off via a processor.

The GB 2 385 205 B shows a switch, in particular an optical switch, for activating/deactivating a power supply for plug-in slots arranged in a housing, into which plug-in cards can be inserted by changing the position of "tension bands" on the housing.

Further embodiments of optical switches arranged on an insertion slot for accommodating an assembly unit, via which a power supply to the assembly unit can be interrupted, can be found for example in U.S. Pat. Nos. 5,625, 238, 6,125,417 and 6,138,194.

In the known state of the art, the hot-plug functionality of an assembly unit usually requires a large number of components, in particular components arranged separately from the assembly unit, which leads to a complex and often space-consuming structure overall. Further disadvantages are the often large number of components to be moved mechanically and the associated increased susceptibility to wear, as well as the often abrupt shutdown of the signal and power supply of the assembly unit or even the abrupt disconnection of the assembly unit from the still fully activated signal and power supply.

As already explained above, if the power supply for such an assembly unit under load is disconnected during removal, the contacts must be suitably robust in order to be able to permanently absorb the voltage peaks arising during removal and effectively counteract premature aging. As a rule, however, the contacts are only designed for a certain nominal current.

Embodiments of the present invention are based on the task of demonstrating an improved way of disconnecting an assembly unit with an electronic circuit unit accommodated therein and electrically connected to a higher-level switching system from this switching system and with which, in particular, it can also be prevented that a system fault is then detected in the case of an assembly unit removed from the switching system.

The above technical problem is solved with an assembly unit having the features of claim 1, with a switching system according to claim 8 and with a method according to claim 9. Useful further developments are the subject of the respective subclaims.

SUMMARY

Accordingly, in an assembly unit having an electronic circuit unit accommodated in a housing, which is electrically connectable to a higher-level switching system for signal and power supply and has a signal processing unit for controlling consumer elements connected to the assembly unit, installed within the housing or being virtual consumer elements, according to the invention it is provided:

A mechanical securing and unlocking element for mechanically securing and unlocking the electronic circuit unit is movably held on the assembly unit in a state electrically connected to a higher-level switching system, the securing and unlocking element being movable relative to the assembly unit between at least two positions manually from outside the assembly unit.

Furthermore, a movement detection device is arranged on the assembly unit, which is designed to detect a relative movement of the securing and unlocking element, the movement detection device being designed to generate an unlock signal in response to a relative movement from a first position, in which the electronic circuit unit is completely mechanically secured in the electrically connected state, to a second position, in which the electronic circuit unit is at least partially mechanically unlocked in the electrically connected state, and to forward this signal to the signal processing unit. The signal processing unit is also designed to switch load-free consumer elements under load in response to the unlock signal, in particular by generating at least one load disconnection signal, so that complete disconnection of the assembly unit with load-free electronic circuit unit from the higher-level switching system is possible during operation.

Consequently, in particular by means of such an assembly unit, a method proposed in accordance with the solution of the invention for disconnecting a circuit unit from a higher-level switching system can be implemented in a simple manner, with which it is proposed, that an electronic circuit unit which is accommodated in a housing of an assembly unit, which has a signal processing unit for controlling consumer elements connected to the assembly unit, installed within the housing or being virtual consumer elements, and which is electrically connected to a higher-level switching system for signal and power supply, is first transferred in the electrically connected state with the higher-level switching system from a completely mechanically secured state to an at least partially mechanically unlocked state before disconnection of the circuit unit from the higher-level switching system is made possible, the transfer from the fully mechanically secured state to the at least partially mechanically unlocked state being detected by the assembly unit and, as a result, consumer elements which are under load being switched load-free by the signal processing unit.

As some essential advantages of the solution according to the embodiments of the present invention are to be mentioned consequently that due to the arrangement of the components necessary for the separation of the electronic circuit unit from the higher-level switching system only at the assembly unit instead of also an arrangement at the switching system a particularly space-saving arrangement with substantially smaller complexity is obtained. Since thus no mechanical components acting on the assembly unit from the switching system and thus from out are necessary to interact, the wear susceptibility is further reduced altogether and also the number of the necessary components can be reduced thereby clearly. Moreover, since the consumer elements are first switched load-free and consequently no more load current flows for them via the electrical contacts, the electrical contacts are also protected when the electrical connection between the circuit unit and the switching system is completely disconnected and consequently do not have to be excessively strong and robust. Finally, the at least partially mechanically unlocked state, into which the circuit unit still electrically connected to the switching system must first be transferred before disconnection of the circuit unit from the higher-level switching system is made possible, can also be used advantageously to prevent disconnection of the assembly unit that is mistakenly interpreted as a system error, i.e., in the case of an assembly unit that is then removed from the switching system, and thus in particular deliberately removed, a system error is not detected.

By the method according to the embodiments of the present invention and in particular by the assembly unit according to the present invention electronic circuit units can thus be separate from the higher-level switching system, i.e. remove therefrom, without resulting in a standstill of the switching system, i.e. in particular of the entire installation or of individual installation parts. An additional manual action, e.g., the additional switching off of the peripheral voltage, is thus no longer necessary for the period of the exchange of the assembly unit.

In an advantageous manner, the contacts between the electronic circuit unit and the higher-level switching system can be designed to be less robust and thus more economical in terms of materials overall, since the voltage peaks that occurred during removal in the switched-on state no longer have to be endured by the contacts. In an advantageous manner, the contacts in the assembly unit according to the invention thus only have to be designed to bear the nominal current that flows through the contacts to the circuit unit during standard operation.

Overall, an assembly unit suitable for carrying out the method can thus be very robust and yet simply manufactured compared to the art.

A preferred embodiment of the present invention provides that the signal processing unit of the assembly unit is additionally designed to electrically disconnect the consumer elements from the circuit unit individually in each case, i.e., to switch them load-free, in particular by means of generating at least several load disconnection signals. The signal processing unit thus expediently generates an individual load disconnection signal for each consumer element. Consequently, each consumer element can be switched off individually, in particular according to type and purpose, so that otherwise possibly caused faults and/or hazards can be effectively prevented by the switching off. Preferably, the signal processing unit can also be designed for this purpose in a practical further development, for the feedback of a complete load current free state of all consumer elements, e.g. upon expiry of a predetermined time period following the initiation of the switch-off process or processes, i.e. in particular following the generated load disconnection signal or signals, and/or after detection of a respective load free state of the consumer elements as a result of corresponding (test-) control.

In a supplementary or alternative further preferred embodiment, the movement detection device of the assembly unit comprises an optical sensor, a movement sensor and/or an acceleration sensor. This makes it possible to unambiguously determine a relative movement and consequently the position of the securing and unlocking element in a particularly simple and effective manner. Also, by use of at least one such sensor any movement and thus position of the securing and unlocking element can be automatically and continuously detected in a simple and effective manner. Also, depending on the application, different types of sensors can be used, in particular with the redundant use of different sensors can also be an increased requirement for operational safety in a simple and effective manner.

Another preferred, supplementary or alternative embodiment provides that the motion detection device comprises at least one signal coupling element and one signal receiving element communicating therewith. The signal coupling element and the signal receiving element communicating therewith may preferably be formed as elements communicating optically with each other, for example to realize a kind of light barrier. One of these two elements, i.e. either the signal coupling element or the signal receiving element, is expediently arranged here on one component from the group of assembly unit components consisting of the housing, the securing and unlocking element and the circuit unit, and the other of these two elements is arranged on one of the two remaining components from this group of assembly unit components. Provided with the arrangement further being that in either the first position or the second position of the securing and unlocking element, communication is enabled between the signal coupling element and the signal receiving element, and in the other position, no such communication is enabled.

Since the communication for this purpose is thus in practical execution expediently lead-free between signal coupling element and signal receiving element, the aforementioned preferred design of these elements as optically communicating elements is thus particularly suitable. Due to the wire-free and thus in particular contactless detection of the relative movement and thus the respective position of the securing and unlocking element, such a type of detection is thus furthermore particularly wear-free and consequently low-maintenance.

In a further, supplementary or alternative, preferred further development, the securing and unlocking element is held inside the housing of the assembly unit and has a guide arm which is guided out of the assembly unit coming from inside the housing and/or the securing and unlocking element is formed with a latching element for mechanically securing the electronic circuit unit in the electrically connected state, in particular with a latching element for latching with a complementary latching element formed on the switching system to be electrically connected.

In a further preferred, supplementary or alternative embodiment, the signal processing unit is further formed upon detection of the second position, expediently also independently of a previously detected relative movement, to perform test scenarios when driving the consumer elements and/or for generating a signal for reporting an electrically connected but at least partially mechanically unlocked state and/or diagnostic results to the higher-level switching system in an electrically connected state and/or for reporting an electrically connected but at least partially mechanically unlocked state and/or diagnostic results to a registration unit comprised by the assembly unit.

The second position of the securing and unlocking element can thus not only be used to perform test scenarios by the signal processing unit itself, in particular also for diagnosing the consumer elements, by means of appropriate control, e.g., by means of firmware appropriately incorporated in the signal processing unit. In addition or alternatively, the signal-based message to the higher-level switching system can also enable the latter, depending on its specific design, e.g., by means of a programmable logic controller (PLC) comprised by the switching system, to initiate test scenarios and/or diagnostic scenarios itself, in particular with respect to the consuming elements, and/or to evaluate diagnostic results transmitted by the signal processing unit. The higher-level switching system can also be prepared in a simple manner with the signal-based message for a possible imminent disconnection of the assembly unit, so that in the event of an assembly unit then being removed from the switching system, the switching system, in particular a PLC comprised by it, does not then recognize this as a system error, e.g. the then occurring "module missing" state can be taken into account there accordingly.

Consequently, the second position of the securing and unlocking element can be used additionally or alternatively to send corresponding signal-based messages also to a registration unit comprised by the assembly unit itself.

Such a registration unit can, for example, have a memory unit with which diagnostic results stored therein can be made available for later evaluation. The registration unit can also be provided additionally or alternatively in such a way that the signal processing unit is triggered in response to the signal-based messages, e.g., by correspondingly incorporated firmware, to perform test scenarios, in particular also for diagnosis of the consumer elements, by corresponding control of the consumer elements.

However, such a registration unit can also additionally or alternatively include an indicator device for an operator, which thus indicates to an operator in particular the at least partially unlocked state, e.g., by means of an optical or acoustic indicator device. By means of the indicator, an operator can consequently detect in a simple and effective manner an incompletely connected state of the assembly unit and thus in particular also of the circuit unit, so that the overall operational safety is again increased. If, furthermore for example, e.g., upon expiry of a predetermined period of time following the initiation of the switch-off process or processes, i.e., in particular following the generated load disconnection signal or signals, and/or after detection of a respective load-free state of the consumer elements as a result of corresponding (test-) control, a diagnostic result is registered as a signal-based message by the registration unit that the load-free condition of all consumer elements is given, this can be indicated accordingly to the operator, who then recognizes that now a disconnection of the assembly unit with load current-free electronic circuit unit from the higher-level switching system is possible during operation, i.e. in particular enabled.

In a further, particularly preferred, but equally supplementary or alternative embodiment, the movement detection device is further designed to generate a securing signal in response to a relative movement from the second position into the first position and to forward it to the signal processing unit, the signal processing unit being designed to apply to consumer elements which are switched load-free load current in response to the securing signal.

Consequently, in a particularly expedient further development, the second position can be used not only by way of a complete disconnection of the assembly unit with load current-free electronic circuit unit from the higher-level switching system, but also for the complete connection of the assembly unit to the higher-level switching system. In particular, the signal processing unit is thus also appropriately designed for this purpose when the second position is detected, and in fact independently of a previously detected relative movement, to perform test scenarios when driving the consumer elements and/or for generating a signal for reporting an electrically connected but at least partially mechanically unlocked state and/or diagnostic results to the higher-level switching system in an electrically connected state and/or for reporting an electrically connected but at least partially mechanically unlocked state and/or diagnostic results to a registration unit comprised by the assembly unit.

According to the embodiments of the present invention, a switching system for an assembly unit which can be electrically connected thereto is consequently characterized in particular by the fact that the switching system likewise has a signal processing unit, e.g., a PLC as mentioned above, which is designed for communication with the signal processing unit of the assembly unit, in particular in the case of a signal sent by the signal processing unit of the assembly unit for reporting an electrically connected but at least partially mechanically unlocked state and/or diagnostic results.

BRIEF DESCRIPTION OF THE DRAWINGS

The preferred embodiments of the present invention are explained in more detail below in conjunction with the accompanying drawings, from which still further features and advantages will be apparent. The figures are schematic representations wherein.

DETAILED DESCRIPTION

Figure 1:
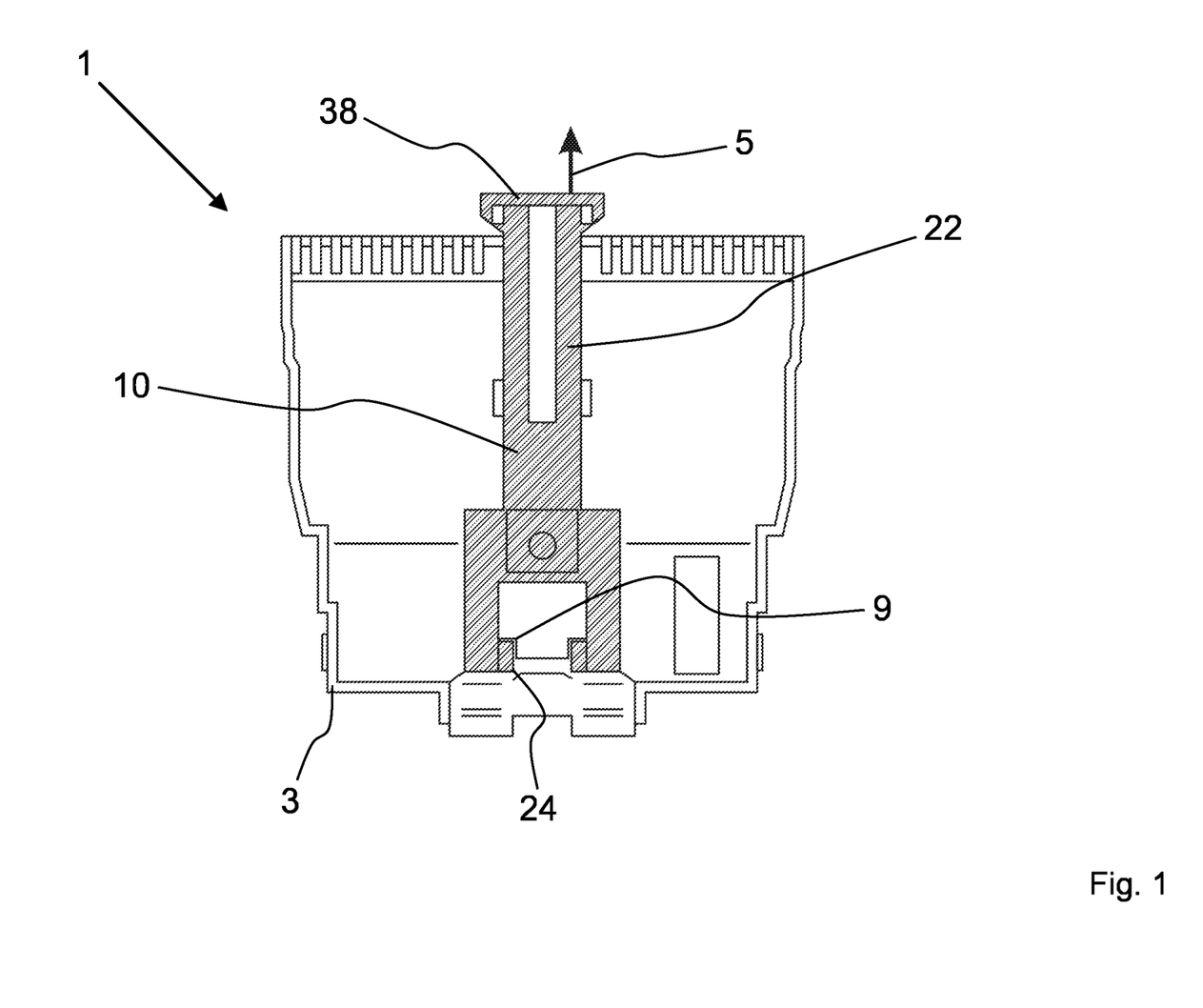
FIG. 1 shows a first view, directed toward a first inner side of a housing of an assembly unit according to the invention, of a mechanical securing and unlocking element expediently held movably within the housing.
Figure 2:
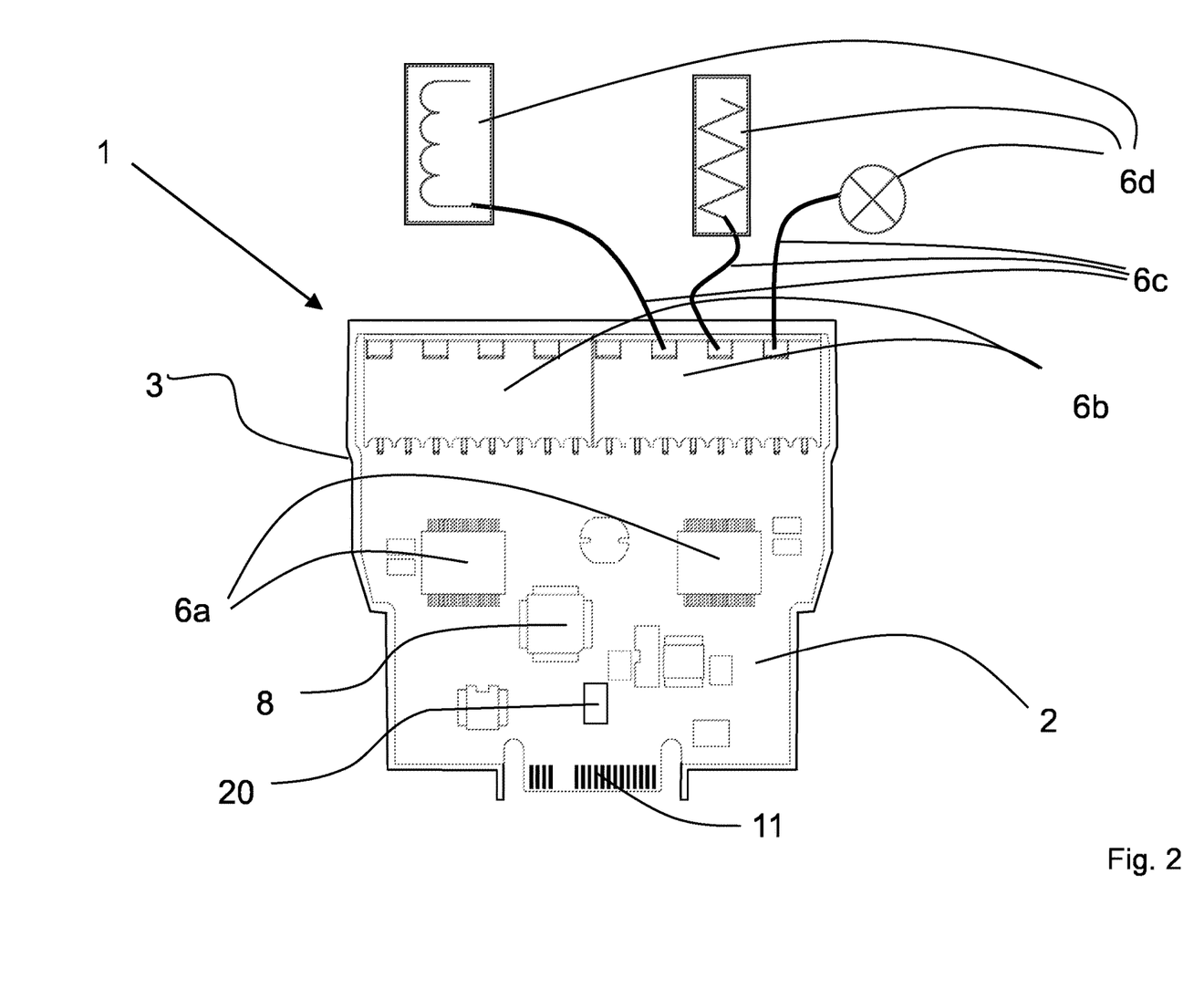
FIG. 2 shows a second view, directed toward a second inner side of the housing of the assembly unit according to FIG. 1, of an electronic circuit unit accommodated in the housing.

FIGS. 1 and 2 show preferred embodiments of an assembly unit 1 according to the invention, which has a housing 3. In the present case, the housing 3 is constructed from two housing parts so that the components housed in the housing can be received in a simple manner in the housing parts and subsequently the housing is completed by assembling the housing parts. Alternatively, the housing may be constructed of more than two housing parts, for example, or the housing may be constructed in one piece and the components to be housed therein are inserted through an opening provided in the housing, for example.

In particular, an electronic circuit unit 2 is accommodated within a housing, which can be electrically connected for signal and power supply to a higher-level switching system not shown in FIGS. 1 and 2 for reasons of clarity. For electrical connection with the higher-level switching system, electrical contacts 11 of corresponding design are provided by the circuit unit 2. The view of FIG. 2 shows, looking towards one of the inner sides of the housing of the assembly unit, a view of such an electronic circuit unit 2 accommodated in the housing 3. The circuit unit 2 has a signal processing unit 8 for controlling consumer elements 6d which are connected to the assembly unit, are installed within the housing or being virtual. In the illustrated embodiment, a plurality of consumer elements 6d are exemplarily outlined as consumer elements connected or connectable to the assembly unit. In such a case, these consumer elements thus designed as external consumers may be connected to the assembly unit, and thus in particular to the circuit unit 2, by means of electrical connecting leads 6c to a peripheral port 6b, in particular standard peripheral connection, for example in the manner of a connection strip, of the circuit unit 2. Furthermore, for interaction with the consumer elements, in particular for interaction with external consumers, the circuit unit 2 may house components with device drivers stored therein, as indicated in FIG. 2 by the components assigned the reference sign 6a. It should be noted that within the scope of the invention not only consumer elements in hardware but also virtual consumer elements can be included, for which correspondingly designed device drivers can likewise be provided with the circuit unit.

Furthermore, the assembly unit 1 comprises a mechanical securing and unlocking element 10 movably held thereon for mechanically securing and unlocking the electronic circuit unit 2 in a state electrically connected to the higher-level switching system, which element is in any case held manually movably from outside the assembly unit 1 relative to the assembly unit 1 between at least two positions. In the illustrated embodiment, the securing and unlocking element 10 is expediently held within the housing 3, and FIG. 1 shows, with a view directed to another inner side of the housing 3, a particularly preferred embodiment of such mechanical securing and unlocking element 10 expediently held movably within the housing. In order to be nevertheless manually movable from outside the assembly unit 1, the securing and unlocking element 10 consequently extends out of the assembly unit and has, for example, expediently a guide arm 22, which is led out of the assembly unit 1 coming from the inside of the housing. A grip element 38 can be formed on the guide arm, which makes it easier for an operator to move the securing and unlocking element 10.

The securing and unlocking element 10 shown in FIG. 1 is further movably held by the housing 3 in such a way that it can be manually displaced by an operator along a direction 5, in the example shown along an axial direction, and in the opposite direction. To execute a relative movement from a first position, in which the electronic circuit unit is completely mechanically secured in an electrically connected state with the higher-level switching system, into a second position, in which the electronic circuit unit 2 can at least remain in the electrically connected state but is at least partially mechanically unlocked, the securing and unlocking element 10 must be moved for this purpose, for example, along a direction 5, i.e., for example, from a position as shown in FIG. 1 in the direction of the arrow occupied by the reference sign 5. In the position shown in FIG. 1, the securing and unlocking element 10 for mechanically securing the electronic circuit unit 2 still engages, for example, in securing recesses 9 arranged in the housing 3 in the electrically connected state. For this purpose, the securing and unlocking element 10 preferably has at least one mechanical latching element 24, to which the guide arm 22 is then expediently connected, as exemplified with the present embodiment, i.e. in particular that the guide arm extends starting from the latching element.

Alternatively or additionally, but not shown in the attached figures for reasons of clarity, the securing and unlocking element for mechanically securing the electronic circuit unit 2 in the electrically connected state can also be formed with a latching element for latching with a complementary latching element formed on the switching system to be electrically connected.

On, or in particular in the case where the securing and unlocking element is held within the housing, within the assembly unit 1, a movement detecting device is provided which is adapted to detect a relative movement of the securing and unlocking element, and thus in particular to detect whether the securing and unlocking element has taken the first position or the second position.

In response to a relative movement from the first position, in which the electronic circuit unit 2 is fully mechanically secured in the electrically connected state, to a second position, in which the electronic circuit unit 2 is at least partially mechanically unlocked in the electrically connected state, the movement detection device is designed to generate an unlock signal 14 and to forward it to the signal processing unit 8.

Figure 5:
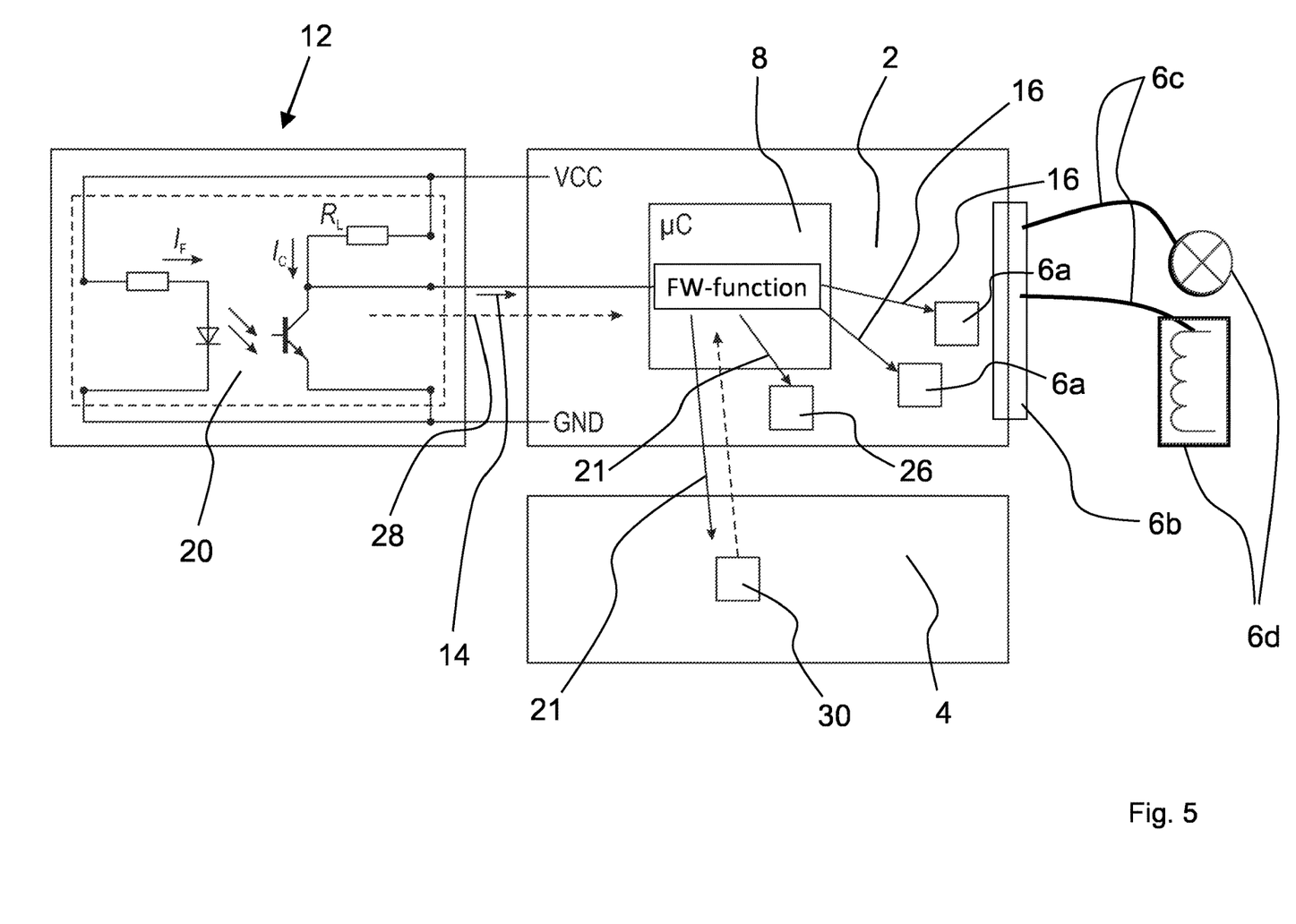
FIG. 5 shows an exemplary, simplified circuit diagram for electrically coupling a motion detection device with a signal processing unit of an assembly unit.

FIG. 5 shows an exemplary, simplified circuit diagram for the electrical coupling of a motion detection device 12 with a signal processing unit 8 of an assembly unit according to the invention. The part of the motion detection device 12 shown on the left in FIG. 5 obtains its power supply expediently as part of the circuit unit 2 via the latter and is connected accordingly to reference potential GND and to an operating voltage VSS. The signal processing unit 8 further comprised by the circuit unit 2 has, for example, a microcontroller μC, in particular with firmware or firmware function "FW-function" incorporated therein. Thus, if an unlock signal 14 is generated by the motion detection device 12 and forwarded to the signal processing unit 8, the latter is designed to switch consumer elements 6*d* that are under load in response to the unlock signal 14 load-free, in particular by means of at least one load disconnection signal 16, so that complete disconnection of the assembly unit 1 with load-free electronic circuit unit 2 from the higher-level switching system is possible during ongoing operation. For disconnection, i.e. in the context of the invention for load disconnection of consumer elements 6*d* under load, in particular for load disconnection of each of the consumer elements 6*d* individually, expediently by means of generation of correspondingly several load disconnection signals 16, as can be seen in FIG. 5, the signal processing unit 8 can thus preferably be equipped, for example, with firmware correspondingly suitable for this purpose and incorporated in the signal processing unit 8, in particular in a microcontroller comprised by the latter. If, as shown in FIG. 5, components 6*a* with device drivers stored therein, expediently electrically connected between the signal processing unit 8 and the consumer elements 6*b*, are included by the circuit unit 2 for interaction with the consumer elements 6*b*, in particular for interaction with external consumers which are electrically connected to a peripheral port 6*b* of the circuit unit 2 by means of electrical connection leads 6*c*, the control of the consumer elements 6*d* by the signal processing unit 8 thus takes place in practical execution with the interposition of the device drivers stored in the components 6*a*. In such a case, in a further practical embodiment, the switching off of consumer elements 6*d* under load can also be carried out in a practical embodiment, for example, by switching off the device drivers stored in the components 6*a*, as a result of which the consumer elements 6*d* are then also switched off.

If the consumer elements 6*d* under load are thus switched load-free in accordance with the invention before the module is removed from its slot, the contacts of the interfaces 6*b* and 11 are consequently also load-free and a complete disconnection of the assembly unit 1 with load-free electronic circuit unit 2 from the higher-level switching system during operation can be made possible.

The motion detection device 12 sketched by way of example in FIG. 5 has a sensor which can be constructed in an application-specific manner, in particular as an optical sensor, a motion sensor and/or an acceleration sensor. In the present case, a signal receiving element 20 of the sensor further includes an optical switch that responds, for example, to coupled light, i.e., when light is incident, and then couples an optical switching signal into the illustrated transistor via the illustrated diode, ultimately generating the unlock signal 14 and transmitting it to the signal processing unit 8. However, a switch can also be constructed to work the other way around, i.e., for example, when no more optical signal in given by means of the represented diode, the switching operation for generating the unlock signal 14 is triggered.

Consequently, the motion detection device 12 generally includes, in addition to a signal receiving element 20, at least one signal coupling element, which, however, is not shown in FIG. 5 for reasons of clarity. It should also be noted that the motion detection device 12 may also include signal receiving elements other than the one shown in FIG. 5, in order to detect the first position and the second position of the securing and unlocking element 10. In particular, the internal communication of the motion detection device 12 for motion detection does not necessarily have to be lead-less, i.e., such receiving elements do not have to be lead-less in design. However, since internal communication, i.e., in particular between a signal coupling element and a signal receiving element communicating therewith, is expediently carried out in a lead-less manner in practical embodiment, the aforementioned preferred design of these elements as elements communicating optically with one another is thus particularly suitable.

The signal coupling element can further be designed as a transmitting element or, for example, also as a reflecting element. As is known, in the case of a signal coupling element designed as a reflection element, a transmitting element and the signal receiving element can also be integrated within one unit.

Figure 3:
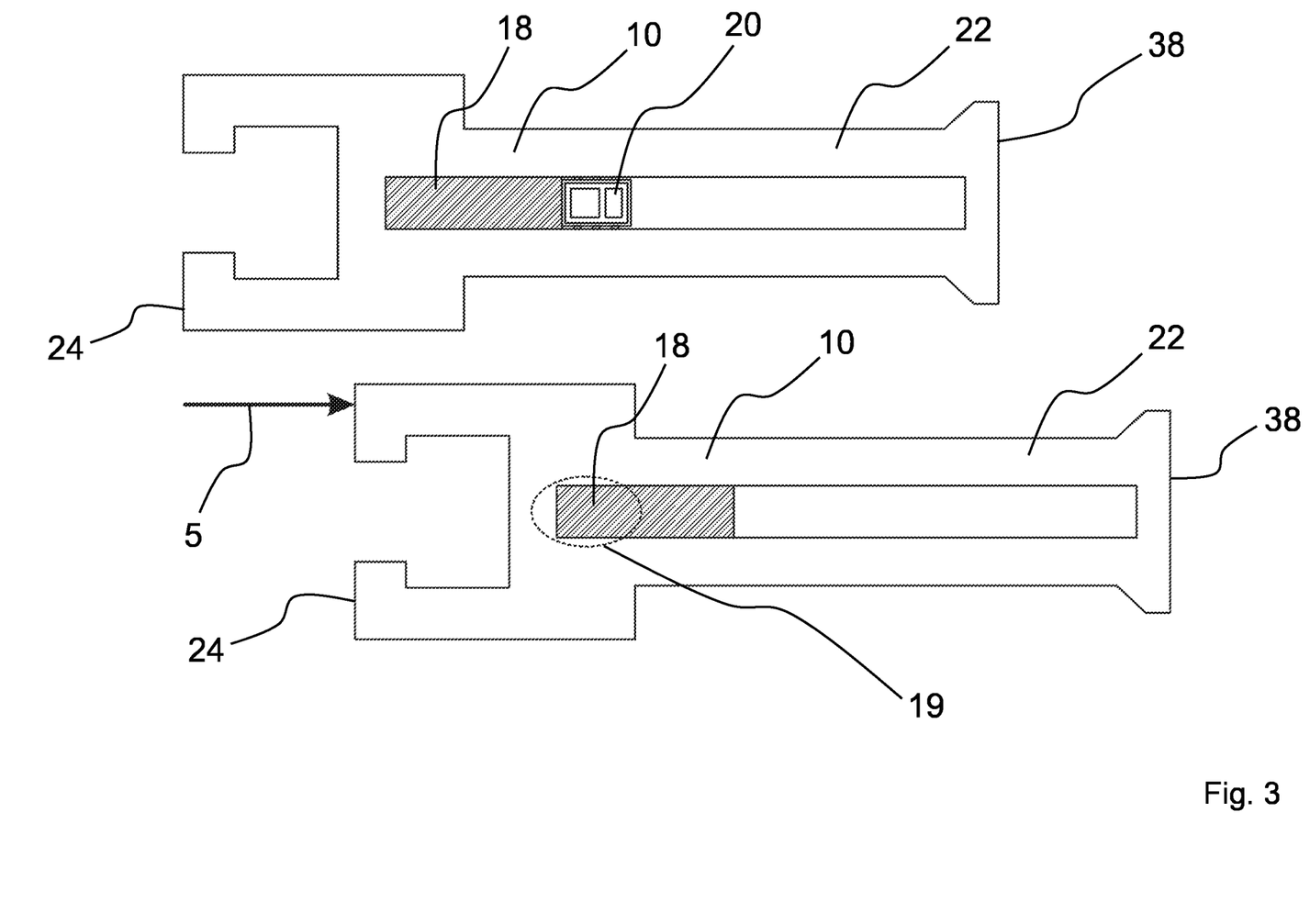
FIG. 3 shows a first exemplary embodiment of a securing and unlocking element and a movement detection device of an assembly unit according to the invention for detecting a first and a second position of the securing and unlocking element.
Figure 4:
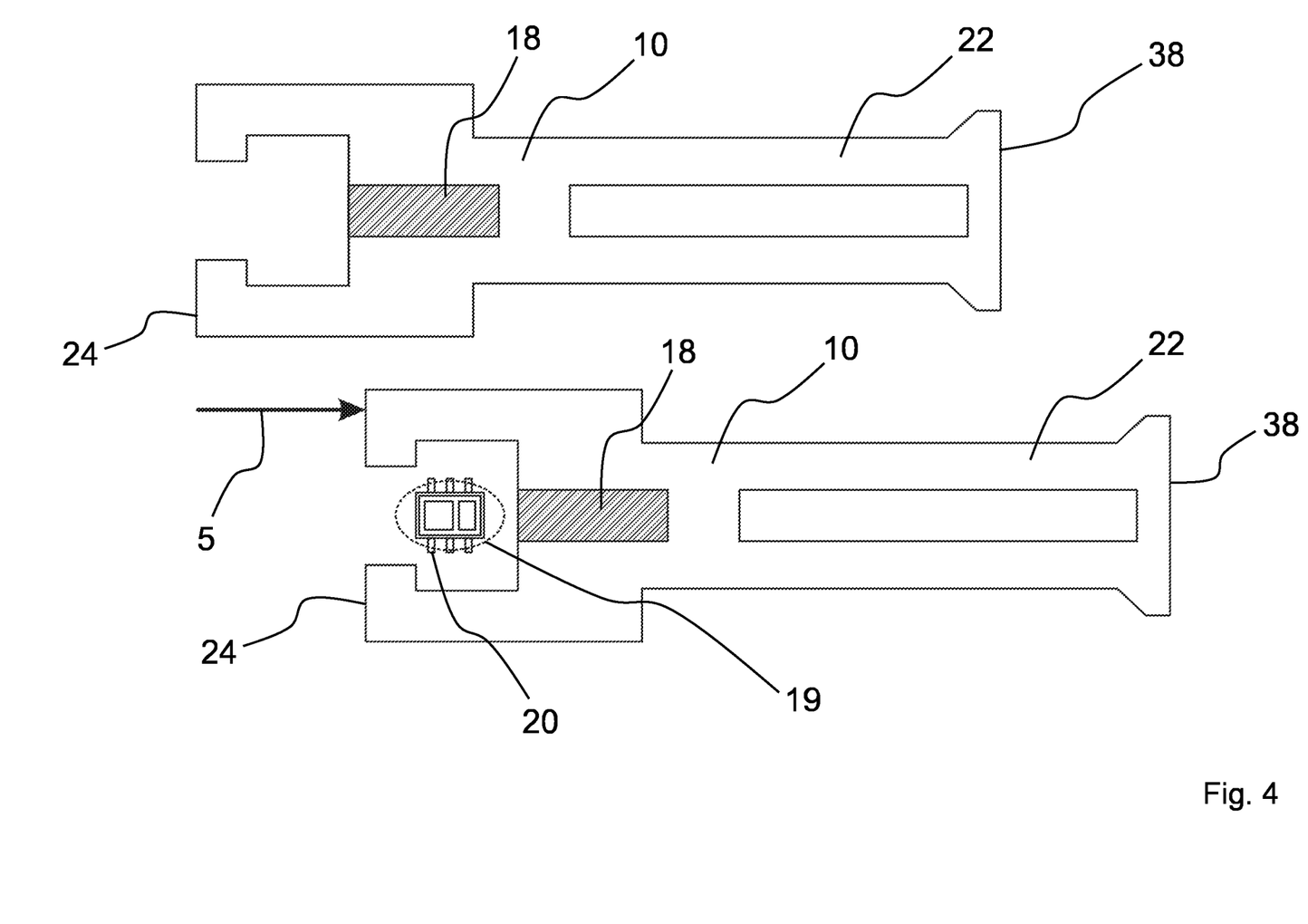
FIG. 4 shows a second exemplary embodiment of a securing and unlocking element and a movement detection device of an assembly unit.

FIGS. 3 and 4 show two exemplary embodiments of a securing and unlocking element 10 and a motion detection device, respectively in a first position of the securing and unlocking element 10 and a second position of the securing and unlocking element 10. The first position is shown at the top and the second position is shown at the bottom in FIGS. 3 and 4, respectively.

As can be seen, the motion detection device according to FIGS. 3 and 4 each has a signal coupling element 18 and a signal receiving element 20 communicating therewith.

One of these two elements 18 and 20 is arranged on one component of the group of components consisting of the housing 3, the securing and unlocking element 10 and the circuit unit 2, and the other of these two elements 18 and 20 is arranged on one of the two remaining components of this group of components. In the embodiments shown, the signal coupling element 18 is arranged, for example, on the securing and unlocking element 10, and the signal receiving element 20 is arranged, for example, on the circuit unit 2, in particular because a circuit for electrically coupling a motion detection device 12 to a signal processing unit 8 described with reference to FIG. 5 is thereby easier to set up than in case the signal receiving element 20 is first arranged on the housing.

In the examples shown, the signal coupling elements 18 are each constructed as reflective elements. Furthermore, in the illustrated examples, the inter-communicating elements 18 and 20 are constructed as optically inter-communicating elements, i.e., as optical elements, in accordance with a particularly expedient embodiment.

The arrangement of the signal coupling element 18 and the signal receiving element 20 can now be selected, as shown for example in FIG. 3, in such a way that in the first position of the securing and unlocking element 10 no communication is possible between the signal coupling element 18 and the signal receiving element 20, according to the example shown a signal reflection effected via the signal coupling element 18 in the direction of the signal receiving element 20 is not possible. In the other, i.e. second position, such communication is enabled, according to the illustrated example a signal reflection effected via the signal coupling element 18 in the direction towards the signal receiving element 20 is possible.

However, the arrangement of the signal coupling element 18 and the signal receiving element 20 can also be selected, as shown for example in FIG. 4, in such a way that in the first position of the securing and unlocking element 10 communication between the signal coupling element 18 and the signal receiving element 20 is possible, according to the example shown a signal reflection effected via the signal coupling element 18 in the direction towards the signal receiving element 20 is possible. In the other, i.e. second position, no such communication is enabled, according to the illustrated example a signal reflection effected via the signal coupling element 18 in the direction towards the signal receiving element 20 is not possible.

The reference sign 19 in FIGS. 3 and 4, the state is marked by way of example in which, in the examples shown, a change in a signal state is triggered during a relative movement of the securing and release element 10 from the first position to the second position and thus the unlock signal 14 is generated as a result. In FIG. 3, this state 19 is given when signal reflection is enabled or effected, and in FIG. 4 when signal reflection is not enabled or does not occur.

Preferably, when the second position is detected, the signal processing unit 8 is also designed, e.g., by means of a microcontroller C as roughly sketched in FIG. 5, in particular with firmware "FW function" incorporated therein, to carry out test scenarios, in particular also for diagnosis of the consumer elements 6*d*, by appropriate control of the consumer elements 6*d*. Control signals required for this can, for example, be additionally impressed on the load disconnection signal 16. In the embodiment sketched according to FIG. 5, the control of the consumer elements is thus initially carried out again with the interposition of the device drivers stored in the components 6*a*.

In addition or alternatively, when the second position is detected, the signal processing unit 8 can also be designed, e.g., by means of the microcontroller 4C as roughly sketched in FIG. 5, in particular with the firmware "FW function" incorporated therein, to transmit a signal 21 for reporting an electrically connected but at least partially mechanically unlocked state and/or diagnostic results to the higher-level switching system 4 in an electrically connected state and/or for reporting an electrically connected but at least partially mechanically unlocked state and/or diagnostic results to a registration unit 26 comprised by the assembly unit 1.

By means of such or a comparable signal-based message 21 to the higher-level switching system 4, the latter can be enabled, for example, depending on its specific design, e.g., by means of a signal processing unit 30 comprised by the switching system, e.g., a programmable logic controller (PLC), to initiate test scenarios and/or diagnostic scenarios itself, in particular with regard to the consumption elements, as indicated by the dashed arrow in FIG. 5, and/or to evaluate diagnostic results remote from the signal processing unit. The signal-based message can also be used to prepare the higher-level switching system 4 in a simple manner for a possible imminent disconnection of the assembly unit, so that if an assembly unit is then removed from the switching system, the switching system, in particular a PLC comprised by it, does not then recognize this as a system error.

If such a signal-based message 21 or a comparable signal-based message 21 is sent in the second position of the securing and unlocking element 10 to a registration unit 26 comprised by the assembly unit 1 itself, the registration unit 26 can store diagnostic results, for example, if it has a memory unit, and these can be made available for later evaluation.

The registration unit 26 can also be provided in a supplementary or alternative manner in such a way that, in response to the signal-based messages, the signal processing unit is in turn triggered, e.g., by correspondingly incorporated firmware, to perform test scenarios, in particular also for diagnosing the consumer elements, by correspondingly controlling the consumer elements.

Such a registration unit 26 can, however, also additionally or alternatively include an indicating device for an operator, which thus indicates to an operator in particular the at least partially unlocked state, for example by means of an optical or acoustic indicator device. By means of the indicator, an operator can consequently detect in a simple and effective manner an incompletely connected state of the assembly unit and thus in particular also of the circuit unit with the switching system 4, so that once again the overall operational safety is increased. If, furthermore for example, e.g., upon expiry of a predetermined period of time following the initiation of the switch-off process or processes, i.e., in particular following the generated load disconnection signal or signals 16, and/or after detection of a respective load-free state of the consumer elements as a result of corresponding (test-) activation, a diagnostic result is registered as a signal-based message by the registration unit 26 in such a way that the load-free state of all the consumer elements is given, this can be indicated accordingly to the operator, who then recognizes that now a disconnection of the assembly unit with load current-free electronic circuit unit from the higher-level switching system is possible during operation, i.e. in particular enabled.

In a further, particularly preferred, but equally supplementary or alternative embodiment, the movement detection device is further designed to generate a securing signal 28, as sketched in dashed lines in FIG. 5, in response to a relative movement from the second position into the first position, and to forward it to the signal processing unit, the signal processing unit then being suitably designed to apply load current to consumer elements that are switched load-free in response to the securing signal.

In this case, too, a message signal 21 initially generated in the second position also serves, for example, to indicate that the circuit unit 2 is in an electrically connected state but is not mechanically secured, at least in part. In this case, the message unit 26 comprised by the assembly unit 1 can thus also warn the operator that the electronic circuit unit 2 is not fully inserted in the slide-in units, so that the operator can correct this faulty state.

When an assembly unit 1 is inserted into the receptacle of a higher-level switching system, there is therefore a state triggering a signal change in this case, not as shown by way of example in FIGS. 3 and 4 respectively marked with the reference sign 19, but based on FIGS. 3 and 4, in each case after a relative movement of the securing and unlocking element 10 from the second position into the first position. Based on FIG. 3, this state would thus be present when signal reflection is no longer enabled or is absent, and based on FIG. 4, when signal reflection is then enabled or is effected.

As is known to the person skilled in the art in and of itself, a switching system 4 as indicated for example in FIG. 5 has corresponding receptacles, e.g. a plurality of slide-in units, for receiving assembly units, which in the context of the invention are then expediently designed to each receive an assembly unit 1 in a receptacle. When receiving such an assembly unit, then, as described above, in the second position the electronic circuit unit 2 is in the electrically connected state with the switching system, but at least partially mechanically unlocked, and in the first position the circuit unit 2 is then in the electrically connected state and completely mechanically secured.

Consequently, in the electrically connected state with the switching system 4, the electrical contacts 11 correspondingly formed by the circuit unit 2 are electrically connected with correspondingly complementary contacts provided in the switching system not shown for clarity.

Furthermore, in the context of the invention, the switching system must have a signal processing unit, for example the signal processing unit 30 indicated in FIG. 5, which is appropriately designed for communication with the signal processing unit 8 of the circuit unit 2. In the context of the invention, therefore, the signal processing unit 30 is appropriately configured to communicate with the signal processing unit 8 of the circuit unit 2 in particular in the case of a signal 21 sent from the signal processing unit 8 of the assembly unit for reporting an electrically connected but at least partially mechanically unlocked state and/or diagnostic results.

Taking into account the above description, it is thus evident that, using the solution according to the invention, the current-driving outputs or the load of the assembly unit 1, i.e., in particular of the circuit unit 2, are electronically switched off before disconnection of the circuit unit from the higher-level switching system is to be made possible, so that the high load current can no longer flow via the interface of the electrical contacts to be disconnected.

At the same time, for example, corresponding diagnostic messages can be sent to the superimposed switching system 4, e.g., to a PLC integrated therein, so that different predefined use cases can then be derived with such a "system function" of the signal processing unit 8.

With the solution according to the invention, a distinction can thus also be made, for example, in particular between a deliberate "pulling" or disconnection and an "accidental falling out" from the receptacle of the higher-level switching system 4.

If, for example, a certain waiting time between unlocking and pulling is required for the shutdown process, a registration unit 26 with a visual or acoustic indicator is particularly suitable, which can then be controlled accordingly so that the "permission" for the operator to pull can be indicated via this.

If precautions can or must be taken in the higher-level switching system 4 until the assembly unit 1 is actually pulled, before the assembly unit 1 is allowed to be pulled, so that a system error is not detected, the signal processing device 30 can also, for example, in accordance with further useful embodiment, control this optical indicator of the registration unit 26, for example via an acyclically executed acyclic service, for example by writing a parameter.

In summary, it can thus further be stated that the invention proposes a method for disconnecting an electronic circuit unit 2 accommodated within a housing 3 of an assembly unit 1, which method is substantially improved in particular compared with the prior art, in which method the circuit unit 2 has a signal processing unit 8 for controlling consumer elements 6d which are connected to the assembly unit, are installed within the housing or being virtual, and is electrically connected to a higher-level switching system 4 for signal and power supply.

In this case, the circuit unit 2 in an electrically connected state with the higher-level switching system 4 is first transferred from a fully mechanically secured state to an at least partially mechanically unlocked state before it is possible to disconnect the circuit unit from the higher-level switching system. The transfer from the fully mechanically secured state to the at least partially mechanically unlocked state can be detected by the assembly unit 1 itself, and consumer elements 6d under load can subsequently be switched load-free by the signal processing unit 8.

In an expedient manner, in the electrically connected state with the higher-level switching system but at least partially mechanically unlocked state, test scenarios are carried out by the signal processing unit 8 when driving the consumption elements 6d and/or a signal 21 is generated for reporting an electrically connected but at least partially mechanically unlocked state and/or diagnostic results to the higher-level switching system 4 in the electrically connected state and/or for reporting an electrically connected but at least partially mechanically unlocked state and/or diagnostic results to a registration unit 26 comprised by the assembly unit 1.

The invention claimed is:

1. An assembly unit which accommodates, within a housing, an electronic circuit unit which can be electrically connected to a switching system for a signal supply and a power supply and has a signal processing unit that controls consumer elements which are connected to the assembly unit, are installed within the housing, comprising:
   a mechanical securing and unlocking element movably held on the assembly unit that mechanically secures and unlocks the electronic circuit unit in a state electrically connected to the switching system;
   the mechanical securing and unlocking element being movable between at least two positions manually from outside the assembly unit;
   a movement detection device arranged on the assembly unit, that detects a movement of the mechanical securing and unlocking element; wherein the movement detection device is designed to generate an unlock signal and to send the unlock signal to the signal processing unit in response to a movement from a first position, in which the electronic circuit unit is completely mechanically secured in the electrically connected state, into a second position in which the electronic circuit unit is at least partially mechanically unlocked in the electrically connected state; and
   the signal processing unit being designed, so that consumer elements which are under load are switched to load-free in response to the unlock signal, in particular by means of generating at least one load disconnection signal, so that the assembly unit with the electronic circuit unit being load-free can be completely disconnected from the switching system during ongoing operation.

2. The assembly unit according to claim 1, wherein the signal processing unit is additionally designed to electrically disconnect the consumer elements from the electronic circuit unit individually in each case, i.e. to switch them load-free, in particular by means of generating a plurality of load disconnection signals.

3. The assembly unit according to claim 1, wherein the motion detection device has an optical sensor, a motion sensor and/or an acceleration sensor.

4. The assembly unit according to claim 1, wherein the motion detection device comprises at least one signal coupling element and one signal receiving element communicating therewith, wherein one of these two elements is arranged on one component from the group of components consisting of the housing, the mechanical securing and unlocking element and the electronic circuit unit and the other of these two elements is arranged on one of the two remaining components of said group of components, and wherein
   either in the first position or in the second position of the mechanical securing and unlocking element communication between the signal coupling element and the signal receiving element is enabled and in the other position no such communication is enabled.

5. The assembly unit according to claim 1, wherein the mechanical securing and unlocking element is held within the housing and has a guide arm which is guided out of the assembly unit coming from the interior of the housing and/or wherein the mechanical securing and unlocking element is formed with a latching element for mechanically securing the electronic circuit unit in the electrically connected state, in particular with the latching element for latching with a complementary latching element formed on the switching system to be electrically connected.

6. The assembly unit according to claim 1, wherein the signal processing unit is designed upon detection of the second position,
   for carrying out test scenarios when driving the consumer elements and/or
   for generating a message signal for reporting an electrically connected but at least partially mechanically unlocked state and/or diagnostic results to the switching system in an electrically connected state and/or for reporting an electrically connected but at least partially mechanically unlocked state and/or diagnostic results to a registration unit comprised by the assembly unit.

7. The assembly unit according to claim 1, wherein the movement detection device is designed to generate a securing signal in response to a movement from the second position into the first position and to send the securing signal to the signal processing unit, the signal processing unit being designed to apply in response to the securing signal load current to consumer elements which are switched load-free.

8. The switching system for the assembly unit according to claim 1, which can be electrically connected thereto wherein the switching system has the signal processing unit which is designed for communication with a signal processing unit of the assembly unit, in particular in the case of a message signal transmitted by the signal processing unit of the assembly unit for the purpose of signaling an electrically connected but at least partially mechanically unlocked state and/or diagnostic results.

9. A method for disconnecting the electronic circuit unit accommodated within the housing of the assembly unit according to claim 1, which has the signal processing unit for controlling consumer elements which are connected to the assembly unit, are installed within the housing and is electrically connected to the switching system for the signal supply and the power supply, comprising the following steps:
   transferring the electronic circuit unit in an electrically connected state to the switching system from a fully mechanically secured state first to an at least partially mechanically unlocked state before a complete disconnection of the electronic circuit unit from the switching system is enabled,
   wherein the transfer from the fully mechanically secured state to the at least partially mechanically unlocked state is detected by the assembly unit and, as a result, consumer elements under load are switched load-free by the signal processing unit.

10. The method according to claim 9, wherein the electrically connected state with the switching system, however, at least partially mechanically unlocked state by the signal processing unit,
- test scenarios are carried out when actuating the consumer elements and/or
- a message signal is generated for reporting an electrically connected but at least partially mechanically unlocked state and/or diagnostic results to the switching system in the electrically connected state and/or for reporting an electrically connected but at least partially mechanically unlocked state and/or diagnostic results to a registration unit comprised by the assembly unit.

* * * * *